(12) United States Patent
DeWald et al.

(10) Patent No.: US 6,928,305 B2
(45) Date of Patent: Aug. 9, 2005

(54) SYSTEMS AND METHODS FOR ESTABLISHING COMMUNICATION LINKS BETWEEN COMPUTING DEVICES

(75) Inventors: Eric L. DeWald, Boise, ID (US); Eric P. Christianson, Meridan, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 529 days.

(21) Appl. No.: 09/941,463

(22) Filed: Aug. 29, 2001

(65) Prior Publication Data

US 2003/0045330 A1 Mar. 6, 2003

(51) Int. Cl.$^7$ ............................................. H04M 11/00
(52) U.S. Cl. ...................... 455/564; 455/460; 455/461
(58) Field of Search .......................... 455/418–420, 455/564, 460, 461; 379/355.01, 355.05, 355.06, 356.01, 355.02

(56) References Cited

U.S. PATENT DOCUMENTS

| | | | | |
|---|---|---|---|---|
| 5,930,350 A | * | 7/1999 | Johnson | 379/355.06 |
| 5,963,623 A | * | 10/1999 | Kim | 379/100.01 |
| 6,049,597 A | * | 4/2000 | Satake et al. | 379/93.08 |
| 6,097,808 A | * | 8/2000 | Chang | 379/355.05 |
| 6,292,271 B1 | * | 9/2001 | Phan | 358/440 |
| 6,295,355 B1 | * | 9/2001 | O'Neal et al. | 379/355.05 |
| 6,631,272 B1 | * | 10/2003 | Dan | 455/460 |
| 6,757,376 B1 | * | 6/2004 | Yoon | 379/355.01 |
| 6,781,575 B1 | * | 8/2004 | Hawkins et al. | 345/173 |

* cited by examiner

*Primary Examiner*—Nick Corsaro
*Assistant Examiner*—Brandon J. Miller

(57) ABSTRACT

Communication systems for establishing communication links between first and second computing devices are provided. A representative system includes a second computing device that incorporates a speed-dial system, a first actuator and a menu. The speed-dial system is configured to receive a first user input corresponding to actuation of the first actuator, determine whether a phone number is associated with the first actuator, and enable the user to associate a first phone number with the first actuator without accessing the menu. So configured, after the user associates a phone number with the first actuator, the second computing device speed-dials the phone number in response to actuation of the first actuator to establish a communication link with the first computing device. Methods and other systems also are provided.

4 Claims, 4 Drawing Sheets

SYSTEMS AND METHODS FOR ESTABLISHING COMMUNICATION LINKS BETWEEN COMPUTING DEVICES

BACKGROUND OF THE INVENTION

1. Field of the Invention

The present invention relates to computing devices. More specifically, the invention relates to systems and methods for establishing communication links between computing devices, such as facsimile machines.

2. Description of the Related Art

Computing devices perform various time-saving functions. For instance, computing devices, such as facsimile machines and multi-function devices, make it possible to acquire image data corresponding to documents. After acquiring the image data, such computing devices enable the image data to be transmitted between locations via a communication network.

In an effort to improve performance of such computing devices, much time has been spent on increasing the speed at which these computing devices operate. For example, much emphasis has been placed on increasing the data transmission rate of computing devices. This potentially decreases the time it takes to transmit image data between locations. Clearly, however, there may be other ways in which to improve the performance of such devices.

For instance, one aspect of a typical computing device that tends to be relatively inefficient relates to set-up of such a computing device for use. In particular, computing devices are known that provide speed-dial functionality, i.e., the computing devices are configured to attempt to establish a communication link after activation of a speed-dial actuator. In order to program speed-dial actuators to enable speed-dialing, a user oftentimes must scroll through a series of menus displayed to the user by a small display screen of the device. As is known, this process can be somewhat time consuming.

SUMMARY OF THE INVENTION

Briefly described, the present invention involves establishing a communication link between computing devices. In this regard, a representative system for establishing a communication link with a first computing device includes a second computing device. The second computing device incorporates a speed-dial system, a first actuator and a menu, with the menu being configured to enable programming of the second computing device. The speed-dial system is configured to receive a first user input corresponding to actuation of the first actuator. The speed-dial system also determines whether a phone number is associated with the first actuator and enables the user to associate a first phone number with the first actuator without accessing the menu. So configured, after the user associates a phone number with the first actuator, the second computing device speed-dials the phone number in response to actuation of the first actuator to establish a communication link with the first computing device.

A representative method for establishing a communication link between a first computing device and a second computing device includes: providing a first actuator and a menu associated with the first computing device, the menu being configured to enable programming of the first computing device; receiving a first user input corresponding to actuation of the first actuator; determining whether a phone number is associated with the first actuator; if a phone number is not associated with the first actuator, enabling the user to associate a first phone number with the first actuator without accessing the menu of the first computing device; and, if a phone number is associated with the first actuator, speed-dialing the phone number to establish a communication link with the second computing device.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION

The present invention involves establishing a communication link with a computing device, such as for the purpose of transmitting information to the computing device. As described in greater detail herein, various embodiments of the invention establish such a communication link with the use of an actuator. In particular, upon actuation, the actuator enables a phone number of the intended recipient of information to be speed-dialed, i.e., the phone number is dialed in response to actuation of a single speed-dial actuator. Preferably, some embodiments facilitate convenient association of such a phone number with an actuator. More specifically, a user can conveniently program such an actuator with a phone number without having to actuate numerous other components and/or navigate through various menus that tend to be associated with conventional computing devices.

Figure 1:
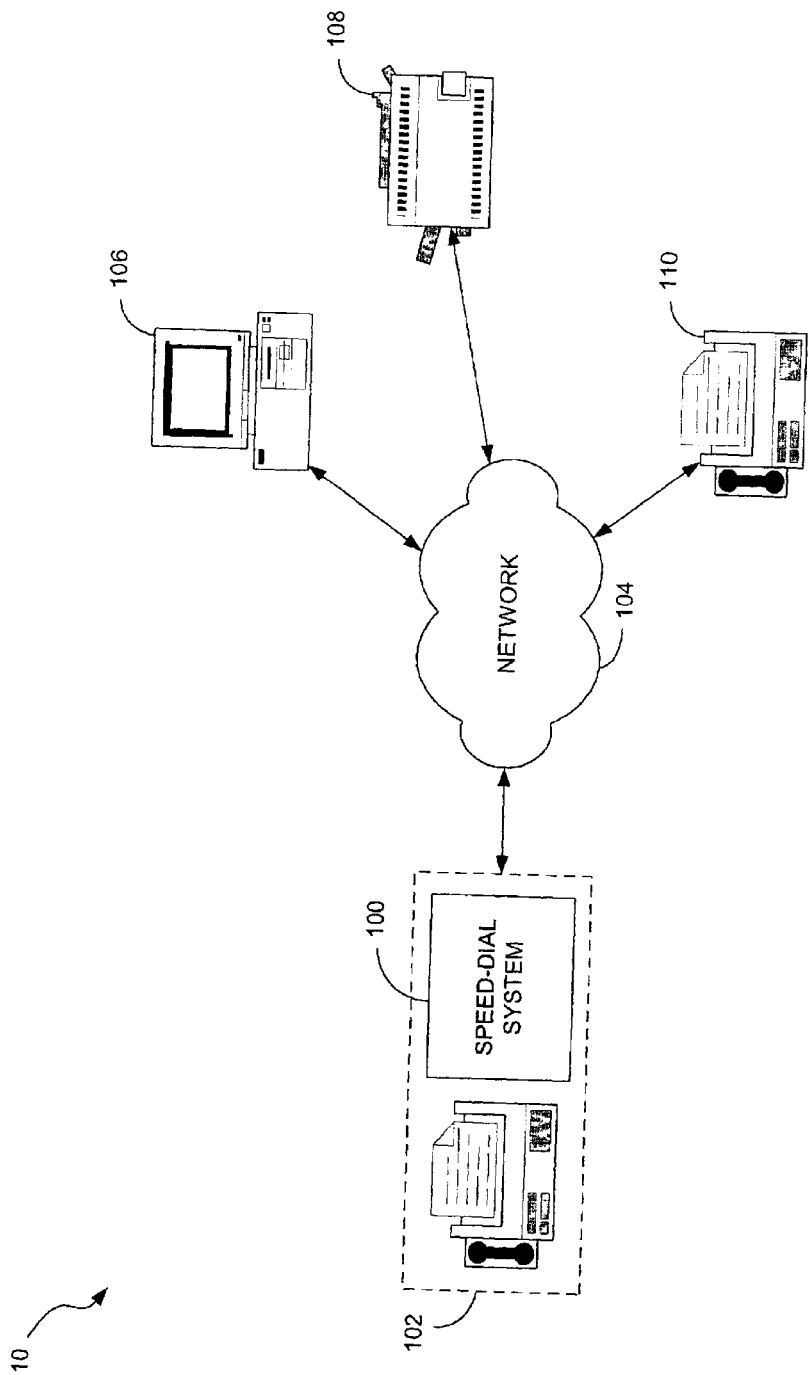
FIG. 1 is a schematic diagram depicting a representative embodiment of the communication system of the present invention.

Referring now to the figures, wherein like reference numerals indicate corresponding components throughout the several views, FIG. 1 depicts a representative embodiment of a communication system 10 of the present invention. In FIG. 1, communication system 10 includes a speed-dial system 100 that is associated with a computing device 102. By way of example, the computing device can be a facsimile machine, multi-function device or any other device that is capable of acquiring and/or transmitting image data corresponding to a document. As used herein, the term "multi-function device" refers to a computing device that is capable of performing more than one of copying, faxing, scanning and printing. The speed-dial system 100 is configured to facilitate establishment of a communication link between computing device 102 and the intended recipient of the image data, as described in greater detail hereinafter.

As shown in FIG. 1, the intended recipient of image data may be associated with a computing device that communicates with a communication network 104. For instance, several representative devices, such as a workstation 106, a printer 108 and a facsimile machine 110, are shown communicating with the network. Note, network 104 may be any type of communication network employing any network topology, transmission medium, or network protocol. For example, network 104 may be any public or private packet-switched or other data network, including the Internet, circuit-switched networks, such as the public switched telephone network (PSTN), wireless network, or any other desired communications infrastructure and/or combination of infrastructures.

By way of example, speed-dial system 100 can facilitate establishment of a communication link with one or more devices, such as workstation 106. Preferably, such a link is established by actuating an actuator, e.g., a button or other mechanically actuated component, or component of a graphical user interface, (not shown in FIG. 1) associated with computing device 102. In response to actuation, speed-dial system 100 of the computing device dials the phone number corresponding to the appropriate device, i.e., the device associated with the intended recipient of information that is to be transmitted from computing device 102. Thus, when information is to be transmitted to workstation 106, speed-dial system 100 attempts to establish a communication link with the workstation. After such a link is established, the computing device can transmit information to the workstation. A user associated with workstation 106 then can print the received information via printer 108, for example.

Speed-dial system 100 can be implemented in software, firmware, hardware, or a combination thereof. Preferably, the speed-dial system 100 is implemented as firmware. When implemented in hardware, however, speed-dial system 100 can be implemented with any or a combination of various technologies. By way of example, the following technologies, which are each well known in the art, can be used: a discrete logic circuit(s) having logic gates for implementing logic functions upon data signals, an application specific integrated circuit (ASIC) having appropriate combinational logic gates, a programmable gate array(s) (PGA), and a field programmable gate array (FPGA).

When implemented in software, speed-dial system 100 can be a program that is executable by a digital computer, e.g., a computer implemented as or associated with a computing device. An example of a computing device that can implement speed-dial system 100 as a software implementation is shown schematically in FIG. 2.

Figure 2:
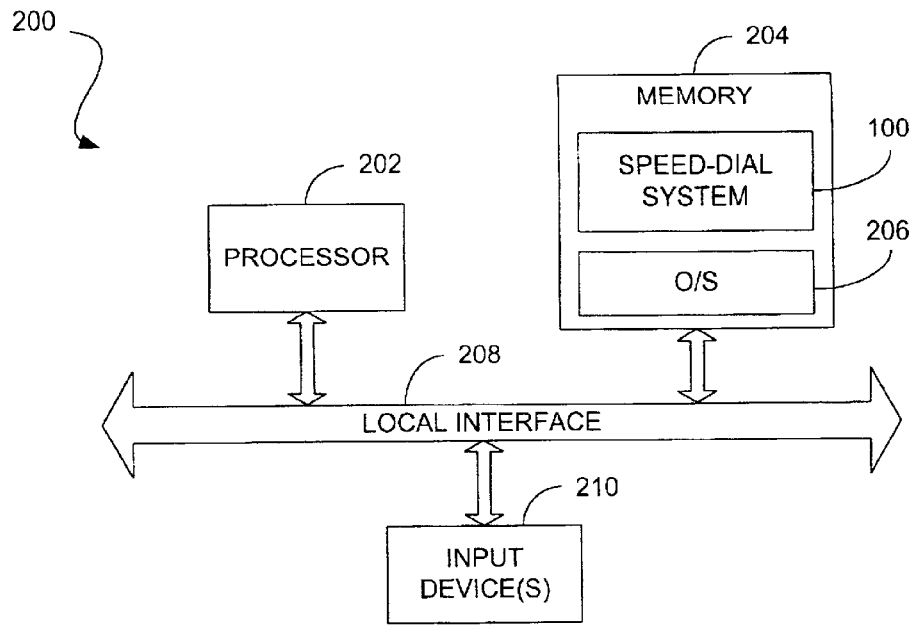
FIG. 2 is a schematic diagram depicting a computer or processor-based device that may be utilized to implement the speed-dial system of FIG. 1.

Generally, in terms of hardware architecture, computing device 200 of FIG. 2 includes a processor 202, memory 204, and one or more input and/or output (I/O) devices 206 (or peripherals) that are communicatively coupled via a local interface 208. Local interface 208 can be, for example, one or more buses or other wired or wireless connections, as is known in the art. Local interface 208 can include additional elements, which are omitted for ease of description. These additional elements can be controllers, buffers (caches), drivers, repeaters, and/or receivers, for example. Further, the local interface may include address, control, and/or data connections to enable appropriate communications among the components of computing device 200.

Processor 202 can be a hardware device configured to execute software that can be stored in memory 204. Processor 202 can be any custom made or commercially available processor, a central processing unit (CPU) or an auxiliary processor among several processors associated with the computing device 200. Additionally, the processor can be a semiconductor-based microprocessor (in the form of a microchip), for example.

Memory 204 can include any combination of volatile memory elements (e.g., random access memory (RAM, such as DRAM, SRAM, etc.)) and/or nonvolatile memory elements (e.g., ROM, hard drive, tape, CDROM, etc.). Moreover, memory 204 can incorporate electronic, magnetic, optical, and/or other types of storage media. Note that memory 204 can have a distributed architecture, where various components are situated remote from one another, but can be accessed by processor 202.

The software in memory 204 can include one or more separate programs, each of which comprises an ordered listing of executable instructions for implementing logical functions. The software in the memory 204 includes speed-dial system 100 and a suitable operating system (O/S) 210. The operating system 210 controls the execution of other computer programs, such as speed-dial system 100. Operating system 210 also provides scheduling, input-output control, file and data management, memory management, and communication control and related services.

The I/O device(s) 206 can include input devices such as a keypad, for example. I/O device(s) 206 also can include output devices such as a display device, speaker or printing device, for example. I/O device(s) 206 may further include devices that are configured to communicate both inputs and outputs such as a touch screen display or USB port, for example.

When the computing device 200 is in operation, processor 202 is configured to execute software stored within the memory 204, communicate data to and from the memory 204, and generally control operations of the portable computing device 200. Speed-dial system 100 and the O/S 210, in whole or in part, are read by the processor 202, perhaps buffered within processor 202, and then executed.

When speed-dial system 100 is implemented in software, it should be noted that the speed-dial system can be stored on any computer readable medium for use by or in connection with any computer-related system or method. In the context of this document, a computer-readable medium is an electronic, magnetic, optical, or other physical device or means that can contain or store a computer program for use by or in connection with a computer-related system or method. Speed-dial system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As used herein, a "computer-readable medium" can be any means that can store, communicate, propagate or transport a program for use by or in connection with an instruction execution system, apparatus, or device. Thus, a computer readable medium can be, for example but not limited to, an electronic, magnetic, optical, electromagnetic, infrared, or semiconductor system, apparatus, device, or propagation medium. More specific examples (a nonexhaustive list) of a computer-readable medium include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program could be electronically captured, via optical scanning of the paper or other medium, then compiled, interpreted or otherwise processed in a suitable manner, if necessary, and then stored in a computer memory.

Reference will now be made to the flowchart of FIG. 3, which depicts the functionality of a representative embodiment of speed-dial system 100. In this regard, each block of the flowchart represents a module segment, portion of code or logic circuit(s) for implementing the specified logical function(s). It should also be noted that in some alternative implementations the functions noted in various blocks of FIG. 3, or any other of the accompanying flowcharts, may occur out of the order in which they are depicted. For example, two blocks shown in succession in FIG. 3 may, in fact, be executed substantially concurrently. In other embodiments, the blocks may sometimes be executed in the reverse order depending upon the functionality involved.

Figure 3:
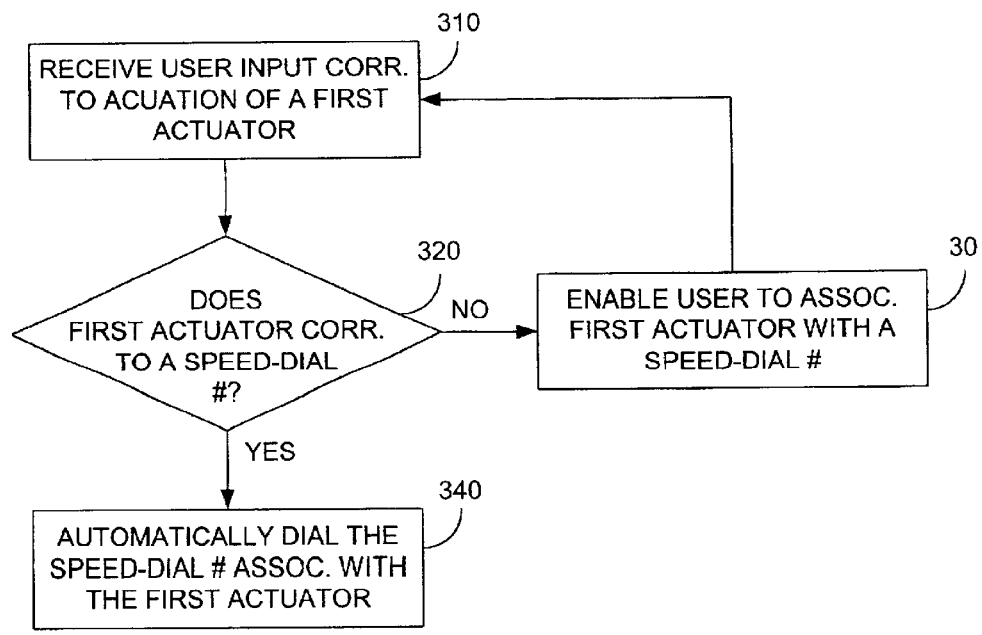
FIG. 3 is a flowchart depicting functionality of a representative embodiment of the speed-dial system of FIG. 1.

As shown in FIG. 3, the functionality of the representative embodiment of the speed-dial system or method 100 may be construed as beginning at block 310 where an input corresponding to a user's actuation of a first actuator is received. In response to the input, a determination is made (block 320) as to whether a speed-dial number is associated with the first actuator. If it is determined in block 320 that a speed-dial number is not associated with the first actuator, the process may proceed to block 330. In block 330, a user is enabled to associate a speed-dial number with the first actuator. Preferably, the user is able to associate the number with the first actuator without having to actuate numerous other components and/or navigate through various menus that tend to be associated with conventional computing devices. If, however, it is determined that a speed-dial number is associated with the first actuator, the process may proceed to block 340. In block 340, the speed-dial number associated with the first actuator is dialed so that a communication link can be established.

By using the speed-dial system 100 (or method), a computing device can potentially exhibit improved performance compared to a similar device that does not incorporate such a system. In particular, by reducing the number of tasks that a user must perform to associate a speed-dial number with a speed-dial actuator, set-up time for a computing device employing the speed-dial system can be reduced. Additionally, if an actuator needs to be programmed with a different speed-dial number, the time required for re-programming the computing device can be reduced.

Figure 4:
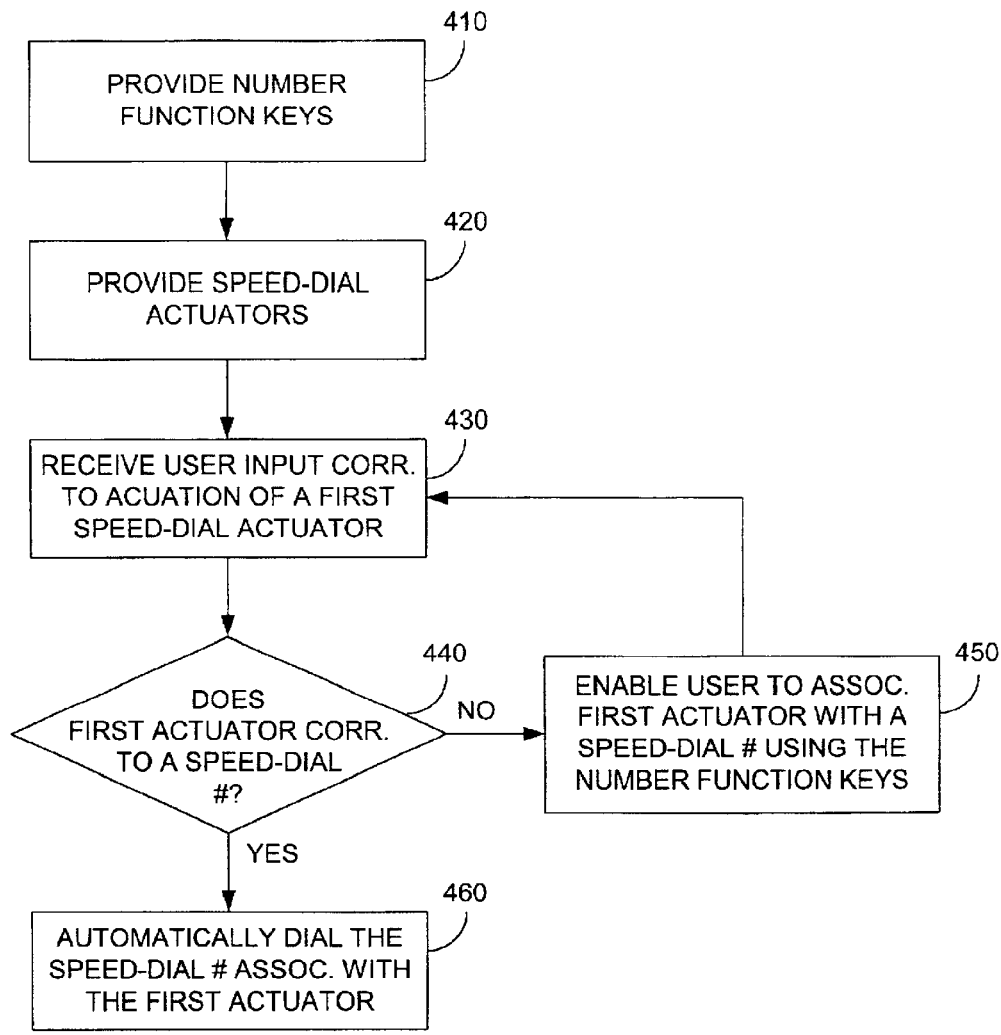
FIG. 4 is a flowchart depicting functionality of another representative embodiment of the speed-dial system of FIG. 1.
Figure 5:
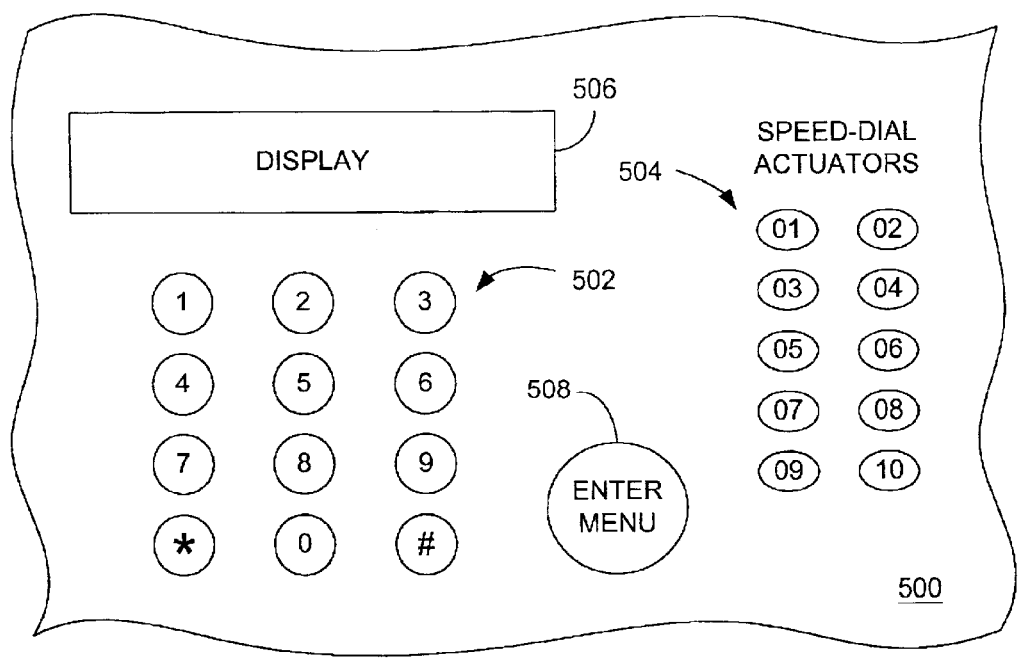
FIG. 5 is a schematic diagram depicting a representative embodiment of a user interface that may be utilized to implement the speed-dial system of FIG. 1.

Alternative functionality of the speed-dial system 100 will now be described with reference to the flowchart of FIG. 4 and the schematic diagram of FIG. 5. As shown in FIG. 4, the speed-dial system or method 100 includes providing number keys and speed-dial actuators (blocks 410 and 420). A representative example of a portion of a computing device 500 that incorporates number keys (502) as well as speed-dial actuators (504), which are configured as buttons, is depicted in FIG. 5.

In block 430, an input corresponding to a user's actuation of a first actuator is received. For instance, the user could have actuated one of the actuators 504, such as by depressing the actuator. In response to the input, a determination is made (block 440) as to whether a speed-dial number is associated with the first actuator. If it is determined in block 440 that a speed-dial number is not associated with the first actuator, the process may proceed to block 450. In some embodiments, the user may be prompted, such as via display device 506, to enter a phone number that is to be associated with the speed-dial actuator if desired. Various other types of information also can be provided to a user via the display device.

In block 450, a user is enabled to associate a speed-dial number with the first actuator. Preferably, the user is able to associate the phone number with the first actuator without having to navigate through various menus (typically, such a menu could be displayed to the user via display device 506). For instance, the user may be immediately able to enter the phone number by using the number keys 502. Note, in some embodiments, the user also may be required to actuate one or more other actuators, such as actuator 508 (the "enter menu" button), before using the number keys to enter a phone number. Note, the number keys and/or enter menu button can be considered means for associating a phone number with the first actuator.

If it is determined in block 440 that a speed-dial number is associated with the first actuator, the process may proceed to block 460. In block 460, the speed-dial system enables the speed-dial number associated with the first actuator to be dialed so that a communication link can be established.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for establishing a communication link with a first computing device, the first computing device having a phone number associated therewith, said system comprising:
    a second computing device having a speed-dial system, a first actuator and a menu, said computing device being configured to transmit image data, said menu being configured to enable programming of said second computing device, said speed-dial system being configured to:
        receive a first user input corresponding to actuation of said first actuator;
        in response to the actuation of said first actuator, determine whether a phone number is associated with said first actuator; and
        if a phone number is not associated with said first actuator, enable the user to associate a first phone number with said first actuator without accessing said menu such that, after the user associates a phone number with the first actuator, said second computing device speed-dials the phone number in response to actuation of said first actuator to establish a communication link with the first computing device;
    wherein said computing device includes number keys; and wherein, if a phone number is not associated with said first actuator, said speed-dial system enables the user to associate the phone number with said first actuator by only using said number keys.

2. The system of claim 1, wherein said first actuator is a button.

3. The system of claim 1, wherein said second computing device is configured to provide a graphical user interface; and wherein said first actuator is a component of said graphical user interface.

4. The system of claim 1, wherein said computing device includes a display screen; and wherein, in response to receiving an input corresponding to actuation of said first actuator and determining that a phone number is not associated with said first actuator, said computing device is configured to inform the user, via said display device, that a phone number can be associated with said first actuator by entering the phone number with said number keys.

* * * * *